(12) United States Patent
Snell et al.

(10) Patent No.: US 7,348,047 B2
(45) Date of Patent: Mar. 25, 2008

(54) MULTI-LAYERED STRUCTURAL CORROSION RESISTANT COMPOSITE LINER

(76) Inventors: Mary Ellen Snell, 2827 Oak, Kemah, TX (US) 77565; Hans P. Sasse, 2827 Oak, Kemah, TX (US) 77565

( * ) Notice: Subject to any disclaimer, the term of this patent is extended or adjusted under 35 U.S.C. 154(b) by 456 days.

(21) Appl. No.: 10/976,379

(22) Filed: Oct. 29, 2004

(65) Prior Publication Data

US 2006/0093791 A1 May 4, 2006

(51) Int. Cl.
B32B 3/00 (2006.01)
B32B 3/12 (2006.01)
B32B 9/00 (2006.01)

(52) U.S. Cl. ............... 428/71; 428/158; 428/167; 428/172; 428/318.4; 428/318.6

(58) Field of Classification Search ........... 428/71, 428/167, 172, 188, 178, 314.4, 317.9, 318.4, 428/318.6, 158
See application file for complete search history.

(56) References Cited

U.S. PATENT DOCUMENTS

| | | | |
|---|---|---|---|
| 3,841,958 A * | 10/1974 | Delorme | 428/117 |
| 4,101,045 A | 7/1978 | Roberts | |
| 4,188,428 A * | 2/1980 | Wolf | 428/71 |
| 4,461,666 A | 7/1984 | Kohn | |
| 4,584,041 A | 4/1986 | Lyman et al. | |
| 4,660,594 A | 4/1987 | Gocze | |
| 4,828,897 A | 5/1989 | Staneluis et al. | |
| 4,925,719 A | 5/1990 | Staneluis et al. | |
| 4,976,290 A | 12/1990 | Gelin et al. | |
| 5,012,950 A | 5/1991 | Knappe | |
| 5,143,768 A * | 9/1992 | Wilderman et al. | 428/68 |
| 5,222,769 A | 6/1993 | Kaempen | |
| 5,230,842 A | 7/1993 | Munde | |
| 5,300,336 A | 4/1994 | Wong et al. | |
| 5,441,170 A | 8/1995 | Bane, III | |
| 5,476,189 A | 12/1995 | Duvall et al. | |
| 5,511,683 A | 4/1996 | Dailey | |
| 5,567,259 A | 10/1996 | Gregory et al. | |
| 5,678,564 A | 10/1997 | Lawrence et al. | |
| 5,698,304 A * | 12/1997 | Brandon et al. | 428/215 |
| 5,743,984 A | 4/1998 | Gregory et al. | |
| 5,780,721 A | 7/1998 | Levens | |
| 5,815,853 A | 10/1998 | Chase | |
| 5,868,169 A | 2/1999 | Catallo | |
| 6,026,862 A | 2/2000 | Friedrich et al. | |
| 6,138,718 A | 10/2000 | Maimets | |
| 6,630,231 B2 | 10/2003 | Perez et al. | |
| 6,706,406 B1 | 3/2004 | Kennedy | |
| 6,708,729 B1 | 3/2004 | Smith | |
| 6,732,763 B2 | 5/2004 | Williamson et al. | |
| 2003/0116214 A1 | 6/2003 | Meli et al. | |

FOREIGN PATENT DOCUMENTS

GB 2018384 A 10/1979

* cited by examiner

*Primary Examiner*—Donald Loney
(74) *Attorney, Agent, or Firm*—Stephen R. Greiner

(57) ABSTRACT

A multi-layered, structural, corrosion resistant composite includes, in an exemplary embodiment, a core layer having a first surface and an opposing second surface, a first fiber reinforced layer bonded to the first surface of the core layer, a second fiber reinforced layer bonded to the second surface of the core layer, and a corrosion resistant thermoplastic liner layer bonded to the second fiber reinforced layer. The core layer is formed from a closed cell polymeric foam.

1 Claim, 3 Drawing Sheets

MULTI-LAYERED STRUCTURAL CORROSION RESISTANT COMPOSITE LINER

BACKGROUND OF THE INVENTION

This invention relates generally to laminated multi-layered composites, and more particularly, to multi-layered composites having a liner layer for providing chemical and corrosion protection to concrete structures.

Protection of concrete structures, such as, holding tanks, containment tanks and sumps, and trenches, from exposure to corroding chemicals is an ongoing problem in, for example, the chemical industry. A number of means of protecting concrete structures are currently in use; however, most of the current protection schemes have serious drawbacks. Epoxy coatings have been used for concrete protection. Failure of the coating due to concrete movement can cause leaks that can result in concrete deterioration. Also, Epoxy coatings are brittle and have very little impact and/or structural strength.

Single skin thermoplastic anchor liners have also been used to protect concrete. These liners are anchored into the concrete during the concrete pouring process. They do not have any structural strength and are not self supportive. Because of the single skin construction, these liners can be easily damaged resulting in concrete exposure to corrosive chemicals. Single skin thermoplastic anchor liners require complicated, costly, and time consuming installation. Further, if there are air pockets between the liner and the concrete, there is a high probability of liner failure due to an expansion of the air pocket which can shear the anchor off the liner permitting weld movement and possible weld failure.

Acid bricks have also been used to protect concrete. Acid bricks are costly and very time consuming to install, and require specially trained installers. Acid bricks are brittle and have low impact strength and very low shear strength. Also, the acid bricks can crack due to movement of the concrete foundations.

BRIEF DESCRIPTION OF THE INVENTION

In one aspect, a multi-layered, structural, corrosion resistant composite is provided. The multi-layered composite includes a core layer having a first surface and an opposing second surface, a first fiber reinforced layer bonded to the first surface of the core layer, a second fiber reinforced layer bonded to the second surface of the core layer, and a corrosion resistant thermoplastic liner layer bonded to the second fiber reinforced layer. The core layer is formed from a closed cell polymeric foam.

In another aspect, a composite material is provided that includes a core formed from a closed cell polymeric foam, a plurality of fiber reinforced skins bonded to opposing surfaces of the core, and a liner bonded to one of the fiber reinforcing skins.

In another aspect, a method of manufacturing a multi-layered composite material is provided. The method includes applying a first fiber reinforced layer to a first surface of a core layer, the core layer including a closed cell polymeric foam, applying a second fiber reinforced layer to a second surface of the core layer, the second surface opposed to the first surface, and applying a thermoplastic liner to the second fiber reinforced layer to form a sandwich construction. The method also includes applying a vacuum to and curing the sandwich construction to form the multi-layered composite article.

DETAILED DESCRIPTION OF THE INVENTION

Multi-layered, structural, corrosion resistant composites are described below in detail. Exemplary composites include a core layer, formed from a structural closed cell foam, sandwiched between two fiber reinforced layers, and a corrosion resistant thermoplastic liner bonded to one of the fiber reinforced layers. The multi-layered composite can be molded into any useful shape to line tanks, trenches, and basins, for example, neutralization tanks, catch basins, digestion towers, trenches, sumps, manholes, sewers, bulk storage vessels, plating tanks, ducts, stacks, and scrubbers. The multi-layered composite can also be used to protect against corrosion of concrete structures, including walls and floors. Because of the structural strength of the core layer, the multi-layered composite provides structural integrity to a liner and continues to function even if the underlying structure fails. The multi-layered composite can be molded to any shape that corresponds to the structure that is to be lined. Because of the structural characteristics of the molded multi-layered composite in conjunction with the thermoplastic liner layer, tank liners and other protective barriers formed from the multi-layered composite have a safety factor to most current single and dual thermoplastic liners.

Figure 1:
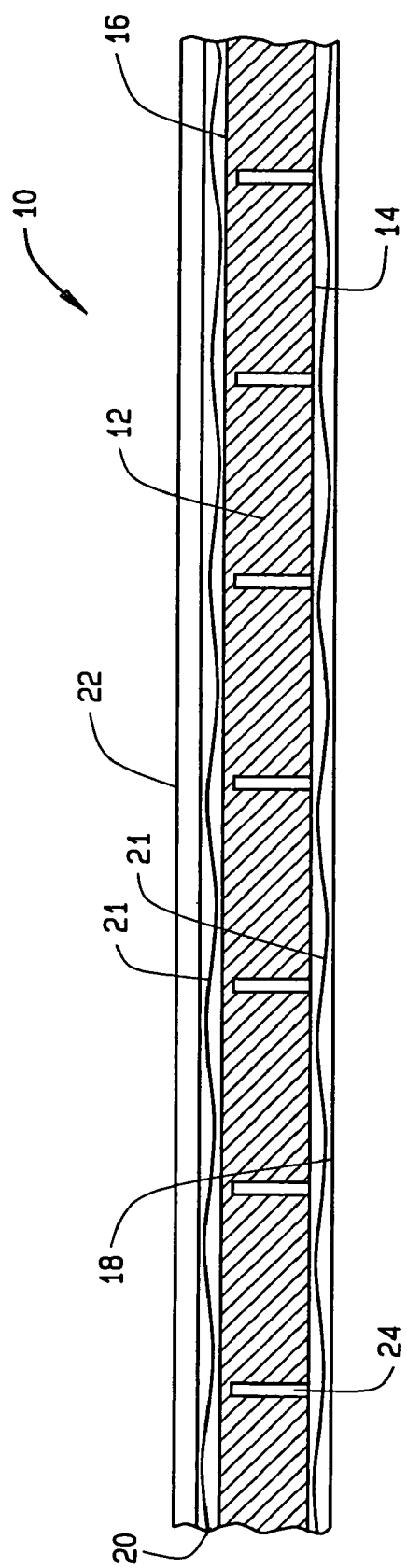
FIG. 1 is a cross sectional schematic illustration of a multi-layered composite in accordance with an embodiment of the present invention.

Referring to the drawings, FIG. 1 is a cross sectional schematic illustration of a multi-layered composite 10. In an exemplary embodiment, composite 10 includes a core layer 12 formed from a closed cell polymeric foam having a first surface 14 and a second surface 16. A first fiber reinforced layer 18 is bonded to first surface 14, and a second fiber reinforced layer 20 is bonded to second surface 16. A thermoplastic liner layer 22 is bonded to second fiber reinforced layer 20.

Figure 2:
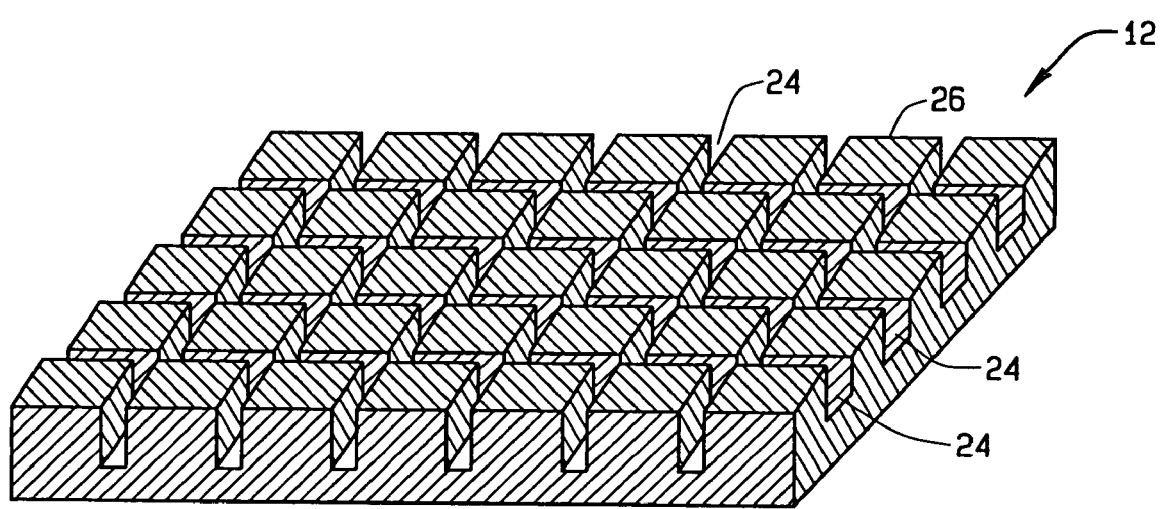
FIG. 2 is a perspective view of the core layer of the multi-layered composite shown in FIG. 1.

Referring also to FIG. 2, a plurality of interconnecting slits 24 extend into first surface 14 of core layer 12. Interconnecting slits 24 can extend any depth into first surface 14, in the exemplary embodiment, slits 24 extend into first surface to a depth that is greater than one-half the thickness of core layer 12. Interconnecting slits 24 form a plurality of rectangular portions 26 of core layer first surface 14. In other embodiments, interconnecting slits form triangular and/or other polygonal portions of first surface 14. In further embodiments slits 24 extend through core 12 and rectangular portions 26 are held together by a fiberglass scrim. The separate portions 26 of core 12 facilitate molding composite 10 into non-flat curved shapes using a mold.

Any suitable closed cell polymeric foam can be used to form core layer 12, for example, PVC foams, polyolefin foams, epoxy foams, polyurethane foams, and polyisocyanurate foams, and mixtures thereof. In one embodiment, the closed cell polymeric foam has a density of about one pound per square inch to about 10 pounds per square inch, in another embodiment, the closed cell foam has a density of about 3 pounds per square inch to about 8 pounds per square inch. The thickness of core layer 12 can range, in one embodiment, from about one-half inch to about 5 inches. In another embodiment, the thickness of core layer 12 ranges from about one-half inch to about 3 inches.

First and second fiber reinforced layers 18 and 20 are formed from a resin or mixture of resins and a plurality if reinforcing fibers. Suitable reinforcing fibers include, but are not limited to glass fibers, graphite fibers, carbon fibers, ceramic fibers, aramid fibers (aromatic polyamid fibers), and mixtures thereof. The reinforcing fibers can be chopped reinforcing fibers, a woven mat of reinforcing fibers, and/or a non-woven mat of reinforcing fibers. Fiber reinforced layers 18 and 20 can each include one or more mats 21 of reinforcing fibers. The reinforcing fiber mats 21 can be any suitable weight. Any suitable polymeric resin can be used in forming fiber reinforcing layers 18 and 20, for example, a vinyl ester resin, an unsaturated polyester resin, including isophthalic polyester resin and bisphenol polyester resin, an epoxy resin, 1,4-epoxy-1,3-butadiene (Furan), and mixtures thereof.

In one embodiment the reinforcing fiber mats 21 are pre-preg composite sheets where the reinforcing fiber mat has been pre-impregnated with a polymeric resin. The pre-preg sheets are formed, for example, by impregnating the sheet of fibers with resin by pulling the sheets through a plurality of resin coated heated rollers to coat the fibers and then the resin is permitted to partially cure, or "B-stage". The resulting pre-preg sheet is malleable and easily formed in a mold.

Thermoplastic liner 22 is formed from any suitable thermoplastic material, for example, polyvinyl chloride, polypropylene, high density polyethylene, polyvinylidene fluoride (Kynar), ethylene-chlorotrifluoro-ethylene (Halar), polytetrafluoroethylene (Teflon), and a thermoplastic elastomeric rubber. The thickness of thermoplastic liner 22 is between about one-eighth inch to about 3 inches. Thermoplastic liner 22, in one embodiment, can include a glass mat backing. In some embodiments thermoplastic liner 22 is chemically treated or etched to improve adhesion to second fiber reinforced layer 20.

Multi-layered composite 10 is fabricated by forming core layer 12 from a closed cell polymeric foam using any known method of forming foam sheets. Interconnecting slits 24 are formed in foam core 12 by any known method, for example slits 24 can be cut into foam core 12 or slits 24 can be molded into foam core 12. First fiber reinforced layer 18 is formed by impregnating a polymeric resin into least one mat 21 of reinforcing fibers and bonding the mats 21 of reinforcing fibers to first surface 14 using the polymeric resin. Second fiber reinforcing layer 20 if also formed by impregnating a polymeric resin into least one mat 21 of reinforcing fibers and bonding the mats 21 of reinforcing fibers to second surface 16 using the polymeric resin. Thermoplastic liner 22 is then bonded to second fiber reinforcing layer 20. A vacuum is applied to the layered structure by any known method, for example, by vacuum bagging, and the polymeric resin is permitted to cure. The vacuum pulls the polymeric resin into slits 24 to provide added strength to core 12.

Figure 3:
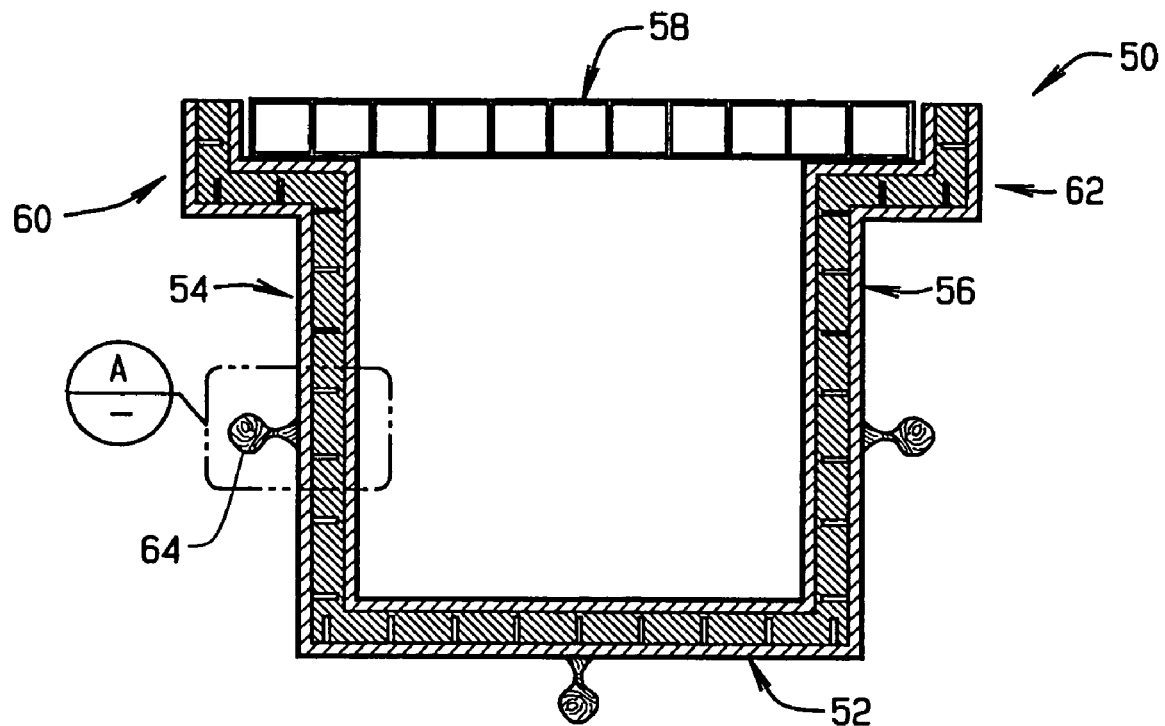
FIG. 3 is a cross sectional schematic illustration of a trench formed with the multi-layered composite shown in FIG. 1.
Figure 4:
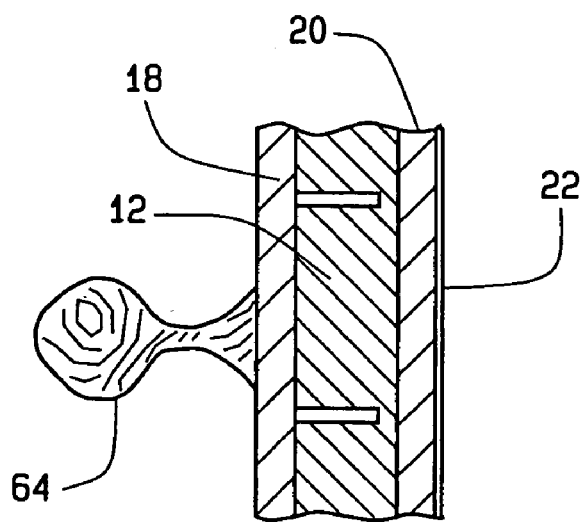
FIG. 4 is an enlarged view of area A shown in FIG. 2.

Multi-layered composite 10 can be fabricated as a flat sheet as shown in FIG. 1. In other embodiments, multi-layered composite 10 is fabricated into contoured articles by using an appropriate shaped mold, including for example a cylindrical pipe or duct structure. FIG. 3 is a cross sectional schematic illustration of a trench structure 50 formed with multi-layered composite 10, and FIG. 4 is an enlarged view of area A. Referring to FIGS. 3 and 4, trench 50 includes a bottom wall 52 and side walls 54 and 56. Trench 50, in another embodiment can also include end walls (not shown) forming a box-like structure, A trench grate 58 is supported by and extends between upper portions 60 and 62 of side walls 54 and 56. Side walls 54 and 56, and bottom wall 52 also include fiber reinforced anchors 64 extending from first fiber reinforced layer 18 of composite 10 that is used to form the walls. Anchors 64 are formed from reinforcing fiber and polymeric resin, and facilitate anchoring trench 50 in concrete poured around the exterior of trench 50.

Multi-layered composite 10 described above can be molded into any useful shape to line tanks, trenches, and basins, for example, neutralization tanks, catch basins, digestion towers, trenches, sumps, manholes, sewers, bulk storage vessels, plating tanks, ducts, stacks, and scrubbers. Articles formed from multi-layered composite 10 include their own containment and structural support such that even if the concrete that composite 10 is covering fails, there is still a containment vessel having structural integrity provided by composite 10. Also, articles formed from composite 10 can be easily repaired by replacing the damaged area or section with a new sheet of composite 10. The new sheet of composite 10 is bonded into place with, for example, an epoxy resin, and the resulting liner seams are welded together. Any air pockets behind the new sheet of composite 10 will not have a deleterious effect on structural integrity because of the integral structural integrity of the new sheet of composite 10. A liner formed from composite 10 can be anchored to an existing concrete structure with anchor bolts with liner bolt head caps, or just placed into the existing concrete structure, or stabilized with sand.

While the invention has been described in terms of various specific embodiments, those skilled in the art will recognize that the invention can be practiced with modification within the spirit and scope of the claims.

What is claimed is:

1. A multi-layered, structural, corrosion resistant composite comprising:

a core layer having a first surface and an opposing second surface, said core layer comprising a closed cell polymeric foam, said core layer also having a plurality of intersecting slits penetrating said first surface that extend to a depth that is greater than one-half of the thickness of said core layer;

a first fiber reinforced layer being bonded to said first surface of said core layer, said first fiber reinforced layer including a first woven mat of reinforcing fibers and a first non-woven mat of reinforcing fibers, said first woven mat and said first non-woven mat being coated with a first polymeric resin, and said first polymeric resin filling said intersecting slits in said core layer;

a second fiber reinforced layer being bonded to said second surface of said core layer, said second fiber reinforced layer including a second woven mat of reinforcing fibers and a second non-woven mat of reinforcing fibers, said second woven mat and said second non-woven mat being coated with a second polymeric resin; and a corrosion resistant thermoplastic liner layer being bonded to said second fiber reinforced layer remote from said core layer.

* * * * *